H. ZURBRICK.
Grain Drill.
No. 67,152.
Patented July 23, 1867.
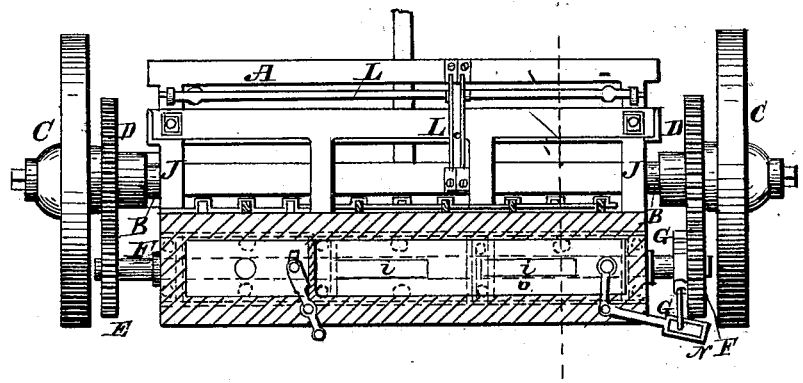
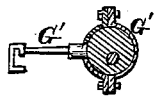
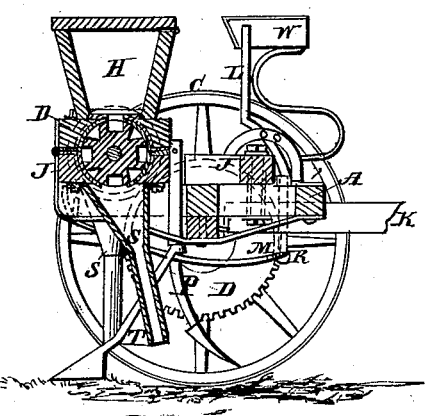

United States Patent Office.

HENRY ZURBRICK, OF ELIZABETHTOWN, OHIO.

Letters Patent No. 67,152, dated July 23, 1867.

CULTIVATOR AND SEED-SOWER.

The Schedule referred to in these Letters Patent and making part of the same.

TO ALL WHOM IT MAY CONCERN:

Be it known that I, HENRY ZURBRICK, of Elizabethtown, in the county of Hamilton, and in the State of Ohio, have invented certain new and useful improvements in Combined Cultivator and Seed-Sower; and I do hereby declare that the following is a full, clear, and exact description thereof, reference being had to the accompanying drawings and to the letters of reference marked thereon.

In the annexed drawings, making part of this specification, A represents a rectangular wooden frame, which is secured upon an axle, B, and this axle is supported upon the wheels C C. The hubs of the wheels C C are provided each with a gear-wheel, D D. Placed upon the frame A is another and somewhat similar though smaller frame J, and confined to it by means of two bolts a, at its forward side. The bolts a pass through small slots in the frame A, so that the rear side of frame may be allowed play, and may be raised a short distance, as though it were hinged. H represents a grain-hopper, which is hinged to a bed-piece, I, which said bed-piece is hinged at its rear side to the frame J. The bed-piece is provided with slots, through which the grain passes from the hopper to the seed-cylinder F. O represents a metallic slotted slide, which lies upon the bed-piece, between it and the hopper, and which answers as a shaker, to keep the grain agitated. Lying upon the frame J, and in suitable bearings, is a shaft, F, which is provided at each end with a gear-wheel, E, which is intended to work in connection with the gear-wheel D. Upon this shaft F are three short seed-cylinders, which are provided with cavities for corn, and also with long grooves, which answer for broadcast sowing. The shaft F is provided with an eccentric-wheel, around which a collar, G, is placed. This collar has a rod, G', connected to it which catches into a slot in a lever, N, which said lever has one end attached to the slide O. When the shaft F revolves, its eccentric-wheel through the collar G, rod G', and lever N, imparts a longitudinal reciprocating motion to the slide O. L represents a vertical lever, which is attached to a cross-bar, L', which has its bearings on the forward side of frame A. Two arms R extend down from the under side of the cross-bar L', and to their lower ends two rods M are attached, which run back and attach at their rear ends to the rear side of the frame J. By the use of this lever L, the rear side of the frame J may be raised so as to throw the machine out of gear, that is, lift the gear-wheels E from connection with the gear-wheels D, so as to stop the motion of the shaft F upon which said wheels E are secured. S S represent the seed-discharge spouts which are connected to the under side of the frame J, in such position as to receive and discharge the grain. P P represent the shanks, with plough-blades attached to their rear ends, which said shanks are slipped into metallic loops on the frame J, and are provided with pin-holes, by means of which they may be raised or lowered vertically. To the shanks P are secured two bars, which project to the rear of the discharge spouts, and are provided on their lower ends with covering-ploughs or blades. The slots in the seed-cylinders or the cavities for corn may be plugged up when it is desired to seed any particular kind of grain.

In using this machine the grain is placed in the hopper as usual, and the machine being set in motion the shaft F, with its seed-cylinders F', is revolved through the instrumentality of the gear-wheels D and E. When the driver, who sits in the seat W, wishes to throw the machine out of gear, he moves the top of lever L forward and throws up the rear of frame J, separating the gear-wheels D and E, which causes the shaft F to stop rotating and discharging seed.

Having thus fully described my invention, what I claim as new, and desire to secure by Letters Patent, is—

1. The hopper H, hinged to the bed-piece I, the bed-piece I, hinged to the frame J, and the frame J, adjustably bolted or hinged to frame A, as and for the purpose herein specified.

2. The arrangement of the lever L, and its connections with the frame J, for the purpose of elevating its rear, and throwing the seeding apparatus out of gear, substantially as specified.

3. The arrangement of the shanks P, with the covering-device attached to the same, and with the adjustable frame J, as and for the purpose specified.

In testimony that I claim the foregoing I have hereunto set my hand this 24th day of April, 1867.

HENRY ZURBRICK.

Witnesses:
URIAH STEVENS,
C. M. ALEXANDER.